United States Patent

Ishikawa

[11] Patent Number: 5,880,855
[45] Date of Patent: Mar. 9, 1999

[54] DOCUMENT PROCESS APPARATUS INCLUDING A MEMORY STORAGE LOCATION FUNCTION

[75] Inventor: Hiroshi Ishikawa, Nakai-machi, Japan

[73] Assignee: Fuji Xerox Co., Ltd., Tokyo, Japan

[21] Appl. No.: 551,920

[22] Filed: Oct. 23, 1995

[30] Foreign Application Priority Data

Nov. 21, 1994 [JP] Japan .................. HEI.6-286606

[51] Int. Cl.⁶ .................. H04N 1/00; B41B 15/00
[52] U.S. Cl. .................. 358/404; 395/115
[58] Field of Search .................. 358/403, 404, 358/444, 468, 449; 395/112, 115, 116, 834, 876, 877, 444

[56] References Cited

U.S. PATENT DOCUMENTS

| | | | |
|---|---|---|---|
| 4,587,633 | 5/1986 | Wang et al. | 358/403 |
| 4,716,543 | 12/1987 | Ogawa et al. | 364/900 |
| 5,369,505 | 11/1994 | Wantanabe et al. | 358/444 |
| 5,535,017 | 7/1996 | Hideaki | 358/444 |
| 5,734,482 | 7/1995 | Miyamoto et al. | 358/404 |

FOREIGN PATENT DOCUMENTS

A-4-54525  2/1992  Japan .................. G06F 3/12

OTHER PUBLICATIONS

Gary and Barbara Bouton, Adobe Photoshop for Windows, pp. 138–140, 1993.

*Primary Examiner*—Kim Yen Vu
*Assistant Examiner*—Kimberly A. Williams
*Attorney, Agent, or Firm*—Oliff & Berridge PLC

[57] ABSTRACT

A document processing apparatus that is adapted to the state of document data to be processed and performs document processing at low cost and efficiently. When document data comes over a communication line, a communication section receives the same to pass the received document data to a storage location selector. If the total size and the number of documents received are less than the predetermined values, the storage location selector transfers the document data to a part of the main memory. If the storage location selector cannot transfer the document data to that part, the storage location selector transfers the document data to one of auxiliary memories. The document data stored in one auxiliary memory is read by the CPU to be processed by the same and an image processor. The results of the document processing are stored in the main memory to be transferred to an output unit over an input/output interface 10 to be recorded.

6 Claims, 6 Drawing Sheets

| | |
|---|---|
| DOCUMENT PROCESSING RESULT STORAGE LOCATION 1 | (8MB) |
| DOCUMENT PROCESSING RESULT STORAGE LOCATION 2 | (8MB) |
| DOCUMENT PROCESSING RESULT STORAGE LOCATION 3 | (8MB) |
| DOCUMENT PROCESSING RESULT STORAGE LOCATION 4 | (8MB) |
| WORK AREA | (8XmMB) |
| FONT AREA | (8XnMB) |

FIG. 2(A)

| | |
|---|---|
| WORK AREA | (8MB) |
| FONT AREA | (16MB) |
| DOCUMENT PROCESSING RESULT STORAGE LOCATION 1 | (24MB) |
| ⋮ | |

FIG. 2(B)

DOCUMENT PROCESS APPARATUS INCLUDING A MEMORY STORAGE LOCATION FUNCTION

BACKGROUND OF THE INVENTION

1. Field of the Invention

The present invention relates to a document processing apparatus such as a printer for externally taking in an image for processing.

2. Description of the Related Art

Conventionally, a printer, or a document processing apparatus, is connected to a communication medium such as a network. Document data is entered by an external host computer into the document processing apparatus. The entered document data is temporarily held in an auxiliary storage unit in the document processing apparatus. The temporary holding of the data is generally referred to as spooling. The spooling allows the document processing apparatus to adapt itself to the variation in the amount of data supplied from the host computer as well as the variation in the data transfer rate caused by the busy condition of communication line. Consequently, problems such as paper jamming on the printer can be handled only by the document processing apparatus.

The spooled data are sequentially read from the auxiliary storage unit, processed in the document processing apparatus to be converted to visible image data that is outputted onto medium such as paper. Generally, the auxiliary storage unit is large in storage size but slow in access speed, taking time in read/write operations. Therefore, it takes time to read spooled data from the auxiliary storage unit; especially, if the data processing time in the document processing apparatus is short, reading the data from the auxiliary storage unit forms a bottleneck in the flow of the entire processing of the document processing apparatus, sometimes retarding the processing.

To solve this problem, a technique was proposed as disclosed in Japanese Patent Non-examined Publication No. Hei-4-54525. In the disclosed method, a buffer of small storage capacity and an auxiliary storage unit having large storage capacity are arranged at the same time. Data is once written to the buffer. When the small-capacity buffer is emptied as the processing progresses, data is moved from the large-capacity auxiliary storage unit to the small-capacity buffer. Thus, processing delay is absorbed by the small-capacity buffer, realizing smooth data transmission.

However, when an attempt is made to implement the above-mentioned conventional technique on a color page printer in which data amount per page is very large, the small-capacity buffer cannot handle required data. Namely, in a page printer, an image to be outputted is generated for each page. Further, in a color printer, images are generated in the same number as the number of colors to be used, four colors of CMYK or RGB for example. Hence, a plurality of images are generated per page. Recently, image resolution has been increasing rapidly, requiring larger storage capacity per page. Consequently, a color page printer requires a storage capacity that is especially large. In the processing in which data amount is very large as compared with the number of pages to be outputted, it is required, beginning from the output processing of the first page, to perform data transfer from the large-capacity auxiliary storage unit to the small-capacity buffer a plurality of times. During the transfer processing, the output processing is interrupted, thereby diminishing the effect of small-capacity buffer installation. Increasing the storage size of the small-capacity buffer increases its production cost.

Spooling incessantly coming color information makes the small-capacity buffer always full to make the auxiliary storage unit always busy, thereby increasing the possibility of the conflict in timing between a write request by external retry and a request for reading from the buffer. If such a conflict occurs, the read operation is disabled, further lowering the processing speed.

SUMMARY OF THE INVENTION

It is therefore an object of the present invention to provide a document processing apparatus that is adapted to the state of document data to be processed and performs document processing at low cost and efficiently.

In carrying out the invention and according to one aspect thereof, there is provided a document processing apparatus comprising: communication means for communicating with a unit connected via a communication medium; an auxiliary memory; a main memory; state holding means for indicating a state of the document processing apparatus; storage location selecting means for referencing the state held in the state holding means, selecting a storage location for storing a document received through the communication means, and storing the received document in the storage location; and processing means for performing processing on the document stored in the storage location by using the main memory; wherein the storage location selecting means selects a part of the main memory as the storage location in one of situations in which the document processing apparatus is not performing processing and the document processing apparatus is performing processing but the document to be processed is below a predetermined condition.

In the above-mentioned document processing apparatus, when the part of the main memory is used as the storage location, the storage location may be made variable in storage size. When the document has been stored in the part of the main memory, the document processing by the processing means and storage of subsequent data into the auxiliary memory by the storage location selecting means may be performed concurrently. Further, the auxiliary memory may be provided in plural and the storage location selecting means selects one of the plurality of auxiliary memories.

According to the invention, a document is received from a unit connected with the communication medium through the communication means. The storage location for the received document is selected by the storage location selecting means. The document is stored in the selected storage location. The processing means processes the document stored in the storage location by using the main memory. The storage location selecting means references the state of the document processing apparatus stored in the state holding means to select the part of the main memory or the auxiliary memory. The part of the main memory is selected if the processing apparatus is not performing processing or, if the same is performing processing, the state of the document to be processed satisfies the predetermined condition. This storage selecting means allows the main memory to be used as a part of a spool area and, at the same time, the processing means to start directly processing the document stored in the main memory. Consequently, the processing delay caused by auxiliary memory read/write operation can be reduced. At the same time, unlike the conventional method, the document need not be stored once in the auxiliary memory to be later transferred to the buffer. And the document is sometimes stored directly in the main memory. This novel constitution therefore reduces the number of times the auxiliary memory is accessed, thereby reducing the contention between the read and write operations on the auxiliary memory.

In processing a color document for example, page areas for the number of colors to be used as post-processing areas are required. For a document having only one color, only a one-page area may be sufficient as the post-processing area. Thus, the storage size of the main memory to be used for storing processing results by the processing means varies to a great extent. According to such a condition of the document processing apparatus, the storage location selecting means may be constituted such that the available storage sizes of the main memory used as a document storage location are made variable. This constitution enhances the efficiency of main memory usage.

When the document has been stored in the part of the main memory, processing is performed on the document stored in the main memory by the processing means. At the same time, subsequent document data may be stored in the auxiliary memory by the storage location selecting means. This constitution allows the storage location selecting means to transfer the subsequent document data to the auxiliary memory when the main memory is full. As a result, the spooling can be performed without interruption, enhancing the efficiency of the document processing.

The auxiliary memory may be provided in plural. The storage location selecting means selects one of the plurality of auxiliary memories to store a document in the selected auxiliary memory. This constitution allows, when a document is being read from one auxiliary memory, the storage location selecting means to store a document in the other auxiliary memory for example. Thus, the contention between the auxiliary memory read and write operations that takes place if there is only one auxiliary memory can be avoided, enhancing the efficiency of the document processing by the processing means.

The above and other objects, features and advantages of the present invention will become more apparent from the accompanying drawings, in which like reference numerals are used to identify the same or similar parts in several views.

BRIEF DESCRIPTION OF THE DRAWINGS

FIGS. 2 (A) and (B) are schematic diagrams illustrating manners in which the storage areas of the main memory are allocated;

DESCRIPTION OF THE PREFERRED EMBODIMENT

This invention will be described in further detail by way of example with reference to the accompanying drawings.

Figure 1:
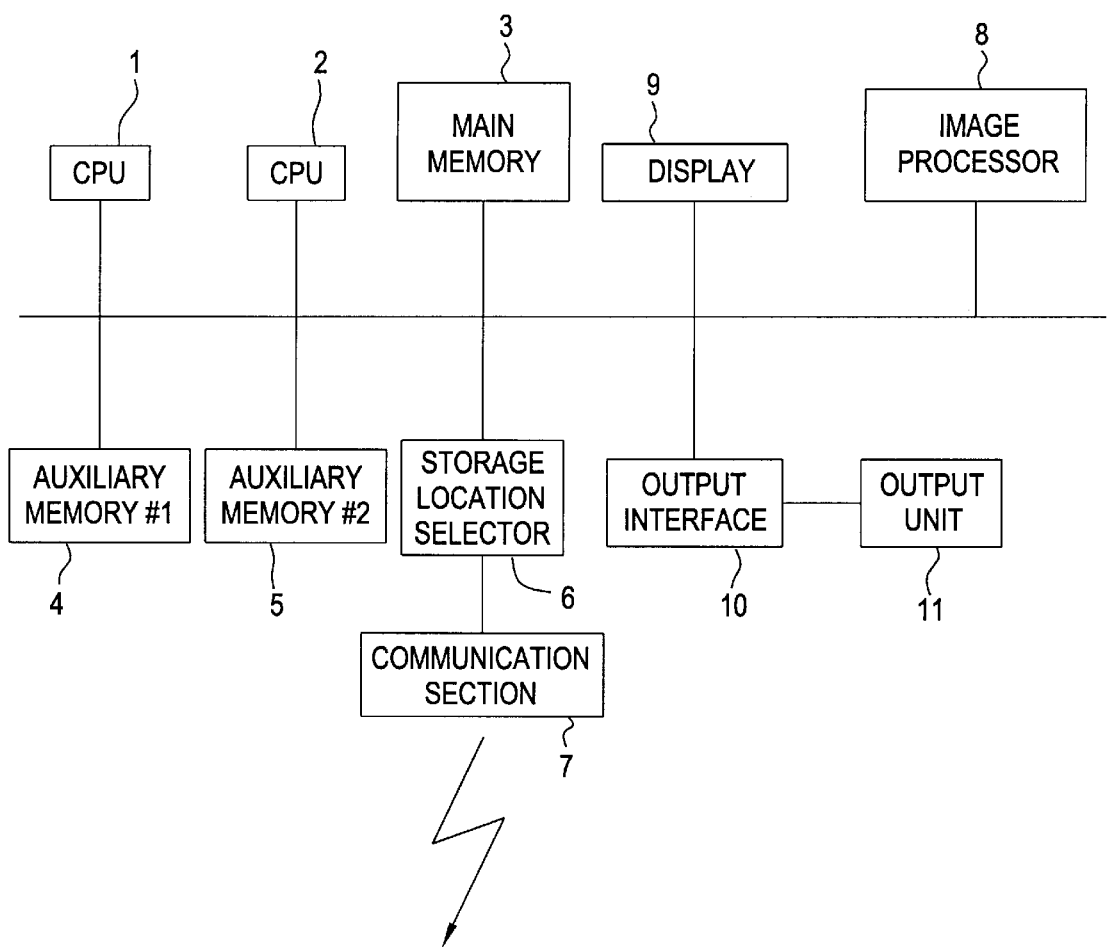
FIG. 1 is a block diagram illustrating a document processing apparatus practiced as one preferred embodiment of the invention.

Referring now to FIG. 1, there is shown a block diagram illustrating the document processing apparatus practiced as one preferred embodiment of the invention. In the figure, reference numerals 1 and 2 indicate central processing units (CPUs), reference numeral 3 a main memory, reference numerals 4 and 5 auxiliary memories, reference numeral 6 a storage location selector, reference numeral 7 a communication section, reference numeral 8 an image processor, reference numeral 9 a display, reference numeral 10 an output interface, and reference numeral 11 an output unit. The document processing apparatus in this embodiment communicates with other apparatuses, not shown, via communication media including but not exclusively a local area network such as the Ethernet and a public switched line such as ISDN, not shown.

The main memory 3 is constituted by an IC memory chip for example and can have a storage capacity ranging from several megabytes to several hundred megabytes in general. The main memory 3 is preset with a plurality of work areas, which are used by processing system software for storing a document file to be processed and processing results, executing processing, and storing character information necessary for document processing.

The main memory 3 is used for storing processing results and by the processing system software with higher priority than is used for storing a document file to be processed. Therefore, if the area for storing the results of document processing is relatively small, a relatively large area is available for storing the document file to be processed. Conversely, if, as with a color document, areas for a plurality of colors for one page as image are required, the area for storing the document processing results becomes relatively larger and the area for storing the document file to be processed becomes relatively smaller. In addition, the size of the area for storing the character information necessary for document processing depends on a character font used. The storage location for the document file to be processed also depends on the size of this area for character font storage area.

The main memory 3 may be allocated to areas of fixed sizes such as the processing result storage area and the storage area for the document file to be processed, by way of example, according to application. However, the size of the processing results largely varies depending on the document processed. For example, the storage size of the processing results has a large variation ranging from several megabytes to 100 megabytes. Hence, the embodiment may be configured such that the areas having only necessary storage sizes are allocated dynamically. Alternatively, the areas of constant or varying storage sizes are provided beforehand to be allocated according to necessary storage sizes. FIGS. 2 (A) and (B) show the manners in which the storage areas of the main memory 3 are allocated. FIG. 2 (A) shows the method in which the main memory is divided into areas having an equal storage size, eight megabytes in this example, to be used as required. FIG. 2 (B) shows the main memory is divided into areas having different storage sizes such as 8, 16 and 24 megabytes for example, from which a minimum area satisfying a required storage capacity is allocated.

Each of the auxiliary memories 4 and 5 is constituted by a mass storage device such as a magnetic recording unit or a magneto-optical recording unit having a storage size ranging from several hundred megabytes to several gigabytes in general. Since the auxiliary memories 4 and 5 are slower in access speed but larger in storage size than the main memory 3, the auxiliary memories can store a plurality of pieces of document data having large sizes received from units, not shown.

There are two CPUs in this embodiment; the CPU 1 and the CPU 2. One of the CPUs, for example CPU 1 at least performs document processing. The other CPU, the CPU 2 partially bears the capability of the storage location selector 6 to determine a location in which a document to be processed is stored, notifies the storage location selector 6 of the determined storage location, and makes the same perform storage processing. The image processor 8 performs part of document processing and, mainly, performs processing for fonts and images of document generated. In addition, the image processor has the data compression/decompression capability to compress a document received via the communication section 7 to store the compressed document in the main memory 3 or the auxiliary memory and decompress the compressed document stored in the main memory or auxiliary memory to send the decompressed document to the output unit.

The communication section 7 receives a document to be processed from other units, not shown, via a communication medium. The storage location selector 6 determines where the document received by the communication section 7 is to be stored and stores the document in the determined location. The storage location is in the main memory 3 or one of the auxiliary memories 4 and 5 as described above.

The display 9 displays the status of the document processing apparatus, messages associated with the document processing, the document to be processed, and the results of the document processing. The output interface 10 passes the results of document processing to the output unit 11. The output unit 11 is equivalent to the recording section of a printer to record the processing results on recording medium.

Figure 3:
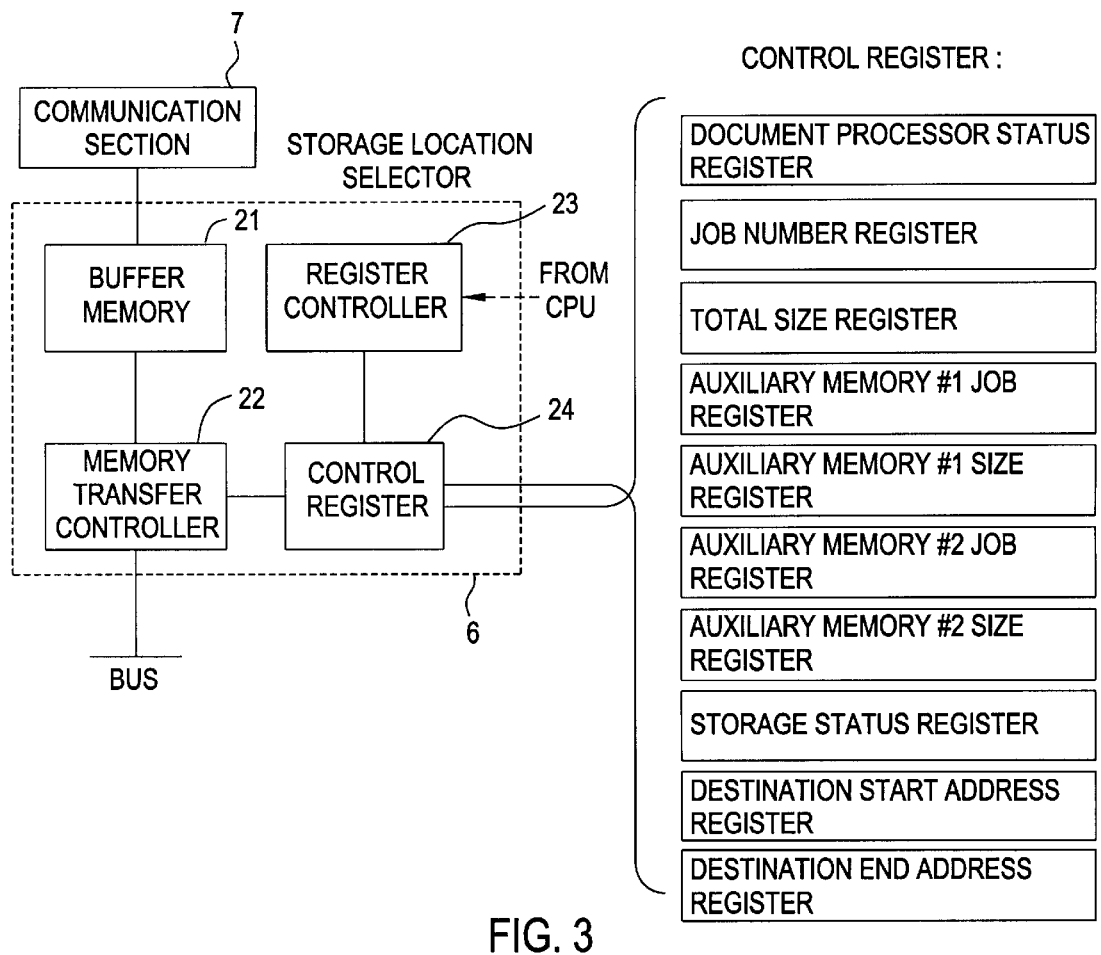
FIG. 3 is a schematic diagram illustrating an example of the storage location selector.

Referring to FIG. 3, there is shown a block diagram illustrating one example of the storage location selector 6. In the figure, reference numeral 21 indicates a buffer memory, reference numeral 22 a memory transfer controller, reference numeral 23 a register controller, and reference numeral 24 a control register. The buffer memory 21 temporarily holds the document received at the communication section 7. The buffer memory 21 is provided to transfer a document to its storage location at a high speed and at once. The memory transfer controller 22 transfers, according to the state set in the control register 24, the document held in the buffer memory 21 to the storage location specified by the control register 24. The register controller 23 controls the control register 24 according to an instruction given by the CPU 2. The register controller 23 numbers the documents in the order the same are received at the communication section 7 to make the documents distinguishable from each other. Each of the numbered documents is transferred through the control register 24 to the auxiliary memory 4 or 5 or the main memory 3.

As shown in FIG. 3, the control register 24 has a document processor status register, a job number register, a total size register, an auxiliary memory #1 job register, an auxiliary memory #1 size register, an auxiliary memory #2 job register, an auxiliary memory #2 size register, a storage status register, a destination start address register, and a destination end address register. The document processor status register holds information indicating whether the CPU 1 is performing document processing or not. The job number register and the total size register hold the number of documents being processed in the CPU 1 and a total file size of the documents, respectively. The auxiliary memory #1 job register and the auxiliary memory #1 size register hold the number of documents to be processed stored in the auxiliary memory 4 (that is, the auxiliary memory #1) and a file size of the stored documents to be processed, respectively. Likewise, the auxiliary memory #2 job register and the auxiliary memory #2 size register hold the number of documents to be processed stored in the auxiliary memory 5 (that is, the auxiliary memory #2) and a file size of the stored documents to be processed, respectively. The storage status register holds information indicating whether the main memory 3 has a free space or not and, if yes, how much free space. This information also indicates whether the auxiliary memories 4 and 5 have a free space or not and, if yes, how much free space. The destination start address register and the destination end address register hold the start and end addresses respectively of a destination to which the document stored in the buffer memory 21 is transferred.

Figure 4:
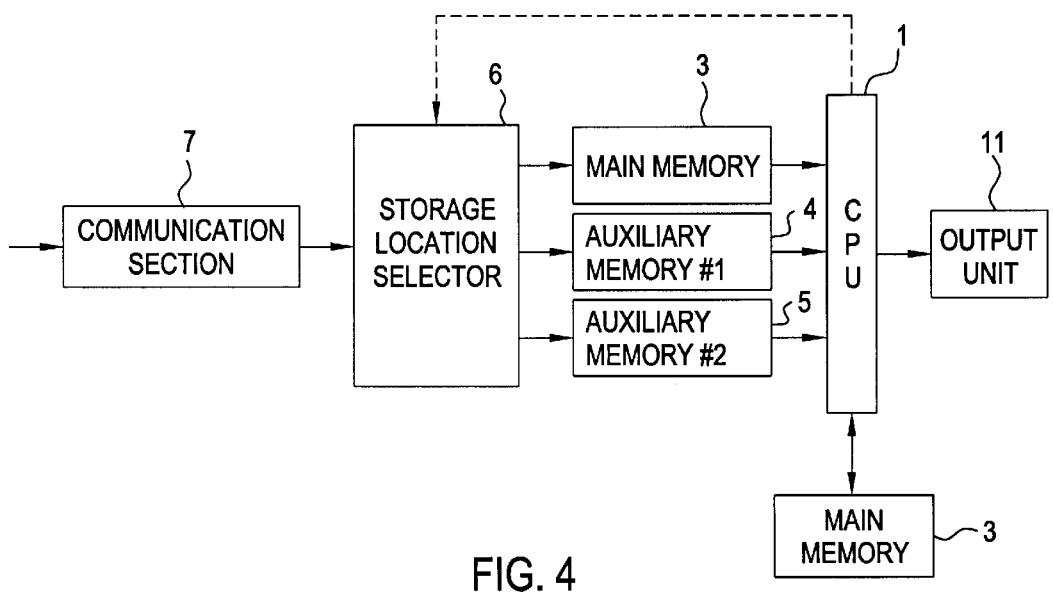
FIG. 4 is a block diagram illustrating the outline of operations in the embodiment of FIG. 1.

Referring to FIG. 4, there is shown a block diagram illustrating the outline of the operations of the above-mentioned embodiment of the invention. As shown, a document comes to the communication section 7 via the communication medium from a unit, not shown. Document data may come from a plurality of units, not shown, simultaneously. The communication section 7 receives the incoming document, which is then stored in the buffer memory 21 of the storage location selector 6. The memory transfer controller 22 of the storage location selector 6 transfers the document from the buffer memory 21 to the main memory 3 or the auxiliary memory 4 or 5 as specified by the control register 24. The document stored in the main memory 3 or the auxiliary memory 4 or 5 is read by the CPU 1 to be processed by the CPU 1 and the image processor 8. The document processing is performed using the main memory 3, the results of the processing being stored in the main memory 3. The processing results stored in the main memory 3 are transferred to the output unit 11 over the output interface 10 to be recorded on a recording medium.

Figure 5:
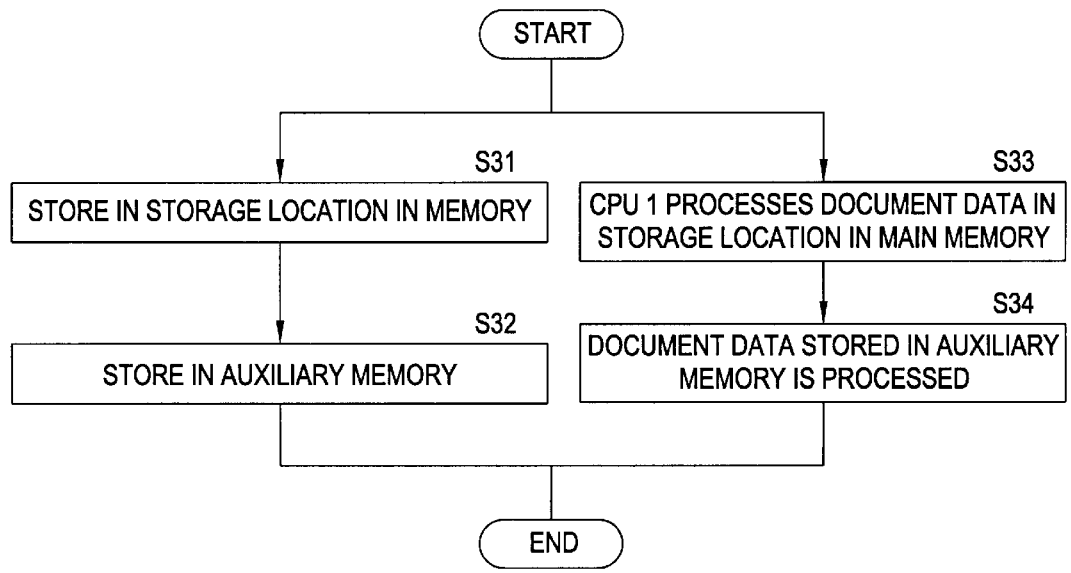
FIG. 5 is a flowchart describing the outline of the document processing by the CPU 1 when the same is not busy and the document data transfer processing by the storage location selector.
Figure 6:
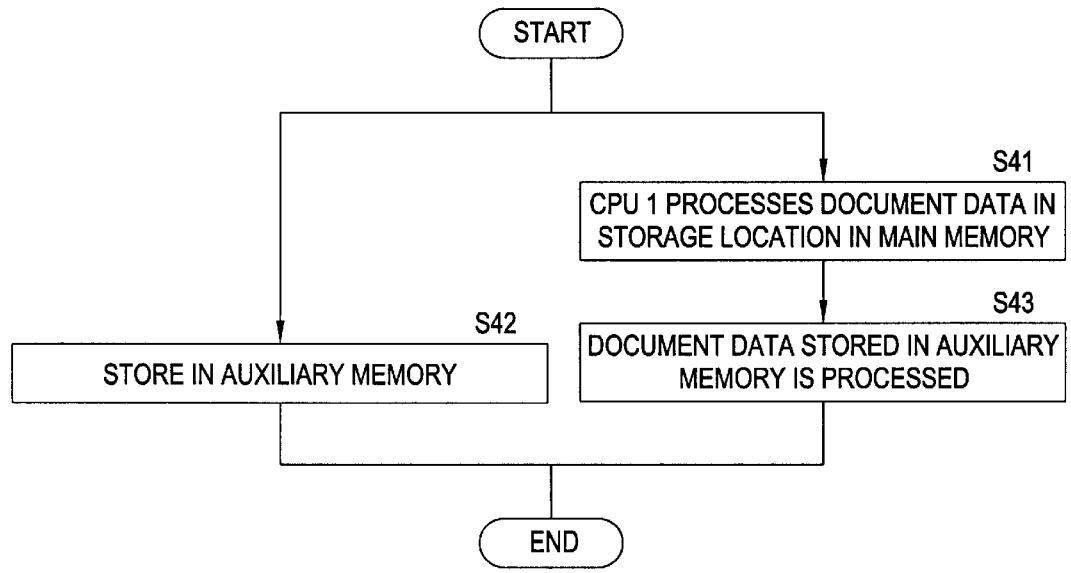
FIG. 6 is a flowchart describing the outline of the document processing by the CPU 1 when the same is busy and the document data transfer processing by the storage location selector.

Referring to FIGS. 5 and 6, there are shown flowcharts describing the outline of the document processing by the CPU 1 and the document data transfer processing by the storage location selector 6. First, the processing in which the CPU 1 is performing no document processing operation. When the CPU is performing no document processing operation, it is assumed that the main memory 3 stores no document to be processed. Therefore, in step 31, the storage location selector 6 transfers document data to a storage location in the main memory 3. When the data transfer to the main memory 3 has been completed, the CPU 1 performs document processing on the transferred document data in step 33. When the storage location selector 6 receives another piece of document data while the CPU 1 is performing the document processing, the selector transfers the received document data to the auxiliary memory 4 or 5 in step 32 while the CPU 1 is performing the document processing. If the main memory 3 has free space, the document data may be transferred to the main memory 3. Upon completion of the processing on the document data stored in the main memory 3, the CPU 1 starts processing the document data stored in the auxiliary memory 4 or 5.

As described before, the main memory 3 stores applications of the processing system software, document files to be processed by the processing system, and the results of the processing done by the processing system. The processing results are transferred to the output unit to increase the free space of the main memory 3 by that amount. The sizes of the applications vary from application to application, the size of each application being determined when the same is identified.

The main memory 3 stores document files to be processed in a memory space provided by excluding the sizes of the applications and the size of the processing results from the total storage size of the main memory 3.

The CPU 1 always monitors the free space in the main memory 3 provided by excluding the sizes of the applications and the size of the processing results from the total storage size of the main memory 3.

If a document of one page described by the system software of this processing system has a maximum size, the CPU 1 holds in memory this maximum size. When the above-mentioned free space in the main memory 3 gets larger than the above-mentioned maximum size, the CPU 1 transfers the document to be processed to the main memory 3. If the free space is large enough, a plurality of documents may be transferred to the main memory 3 simultaneously.

Referring to FIG. 6, if the CPU 1 is performing processing on the document data stored in the main memory 3 in step 41, the storage location selector 6 transfers the document data to the auxiliary memory 4 or 5 in step 42. If the main memory 3 has enough free space, the selector 6 may transfer the document data to the main memory 3. Upon completion of the processing of the document data in the main memory 3, the CPU 1 starts processing the document data stored in the auxiliary memory 4 or 5.

Figure 7:
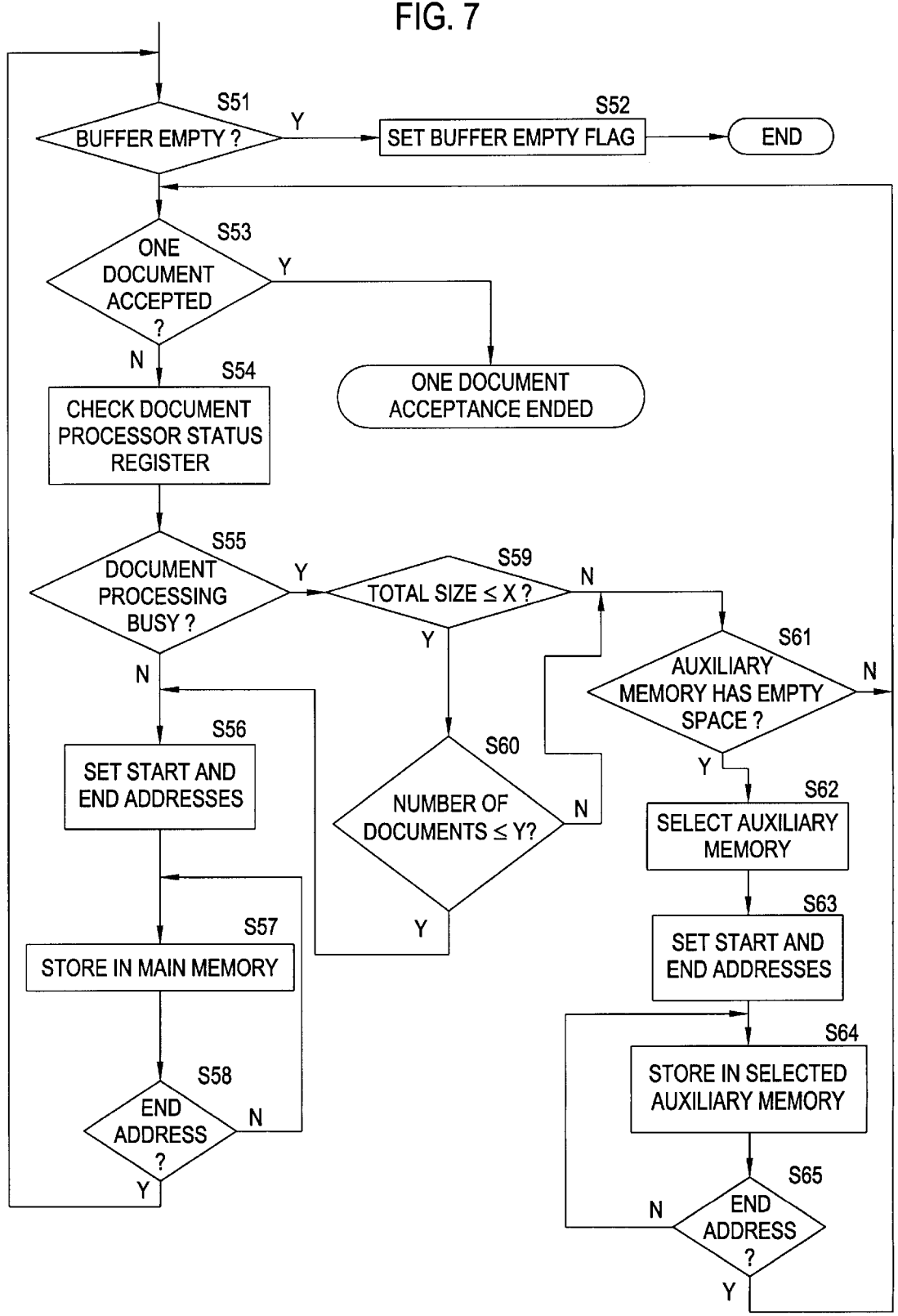
FIG. 7 is a flowchart describing an example of the document transfer processing in the embodiment of FIG. 1.

The above-mentioned operations will be described in more detail below. Referring to FIG. 7, there is shown a flowchart describing an example of the document transfer processing in the above-mentioned embodiment of the invention. First, in step 51, whether the buffer memory 21 is empty or not is determined. If the buffer memory 21 is found empty, there is no need for document transfer. In step 52, a buffer empty flag is set and the processing is ended. If a document comes to the communication section 7, the buffer empty flag is referenced. If the buffer memory 21 is empty, the document is received and stored in the buffer memory 21. In this case, since the buffer memory 21 is not empty as determined in step 51, the process goes to step 53. In step 53, whether one document to be processed has been accepted or not is determined; if yes, this transfer processing is ended.

If no in step 53, the document processor status register in the control register 24 is checked in step 54. Whether the CPU 1 to perform the document processing is busy or not is determined by this check in step 55; if the CPU 1 is found not busy, the process goes to step 56. Even if the CPU 1 is found busy, if the total size is less than a predetermined size X in step 59 and the number of documents is less than a predetermined value Y in step 60, the process also goes to step 56. The total size and the number of documents may be found by referencing the total size register and the job number register.

If the total size is less than X, the free space of the main memory 3 is equal to the maximum document size of one page described by the system software of the processing system.

In steps 56 through 58, the transfer to the main memory 3 is performed. In step 56, the start and end addresses of the destination are set. In step 57, the transfer and storage in the main memory are performed. In step 58, the transfer and storage are repeated until the end address is reached. This document transfer to the main memory is performed immediately when the CPU 1 is not busy. When the CPU 1 is busy, the coming document is processed after the remaining processing to be performed by the CPU 1 has been completed. When the specified storage location in the main memory becomes full, the storage location selector 6 transfers the remaining data to the auxiliary memory. To do so, the process goes back to step 51 for the transfer and storage of the remaining data.

In steps 55, 59 and 60, the main memory or the auxiliary memory is selected as the destination. The main memory is selected if the document processor status register is not busy and, even if the same is busy, the total size of the documents not yet processed is less than the predetermined value and the number of documents not yet processed is less than the predetermined value. For example, if the document data is written in a page description language and includes color information, the total size is less than 32 megabytes when the storage size of the main memory 3 is 48 megabytes, and the number of jobs not yet processed is two or one. This condition may be set in the system configuration appropriately. When the total size is 32 megabytes, the storage status register indicates an available storage space of 16 megabytes of the main memory 3. The document data is transferred by the memory transfer controller of the storage location selector 6 to this available storage space.

If the CPU 1 is busy and the total size indicating the size of the documents stored in the main memory is larger than the predetermined value X or the number of documents stored in the main memory is larger than the predetermined value Y, then whether the auxiliary memory is empty or not is determined in step 61. If the auxiliary memory is found empty, the transfer and storage in the auxiliary memory are performed in steps 62 through 64. In step 62, the auxiliary memory 4 or the auxiliary memory 5 is selected. In step 63, the start address and end address are set to a storage location in the selected auxiliary memory. In step 64, the transfer and storage in the auxiliary are repeated until the end address is reached in step 65. Then, the process goes back to step 53.

Figure 8:
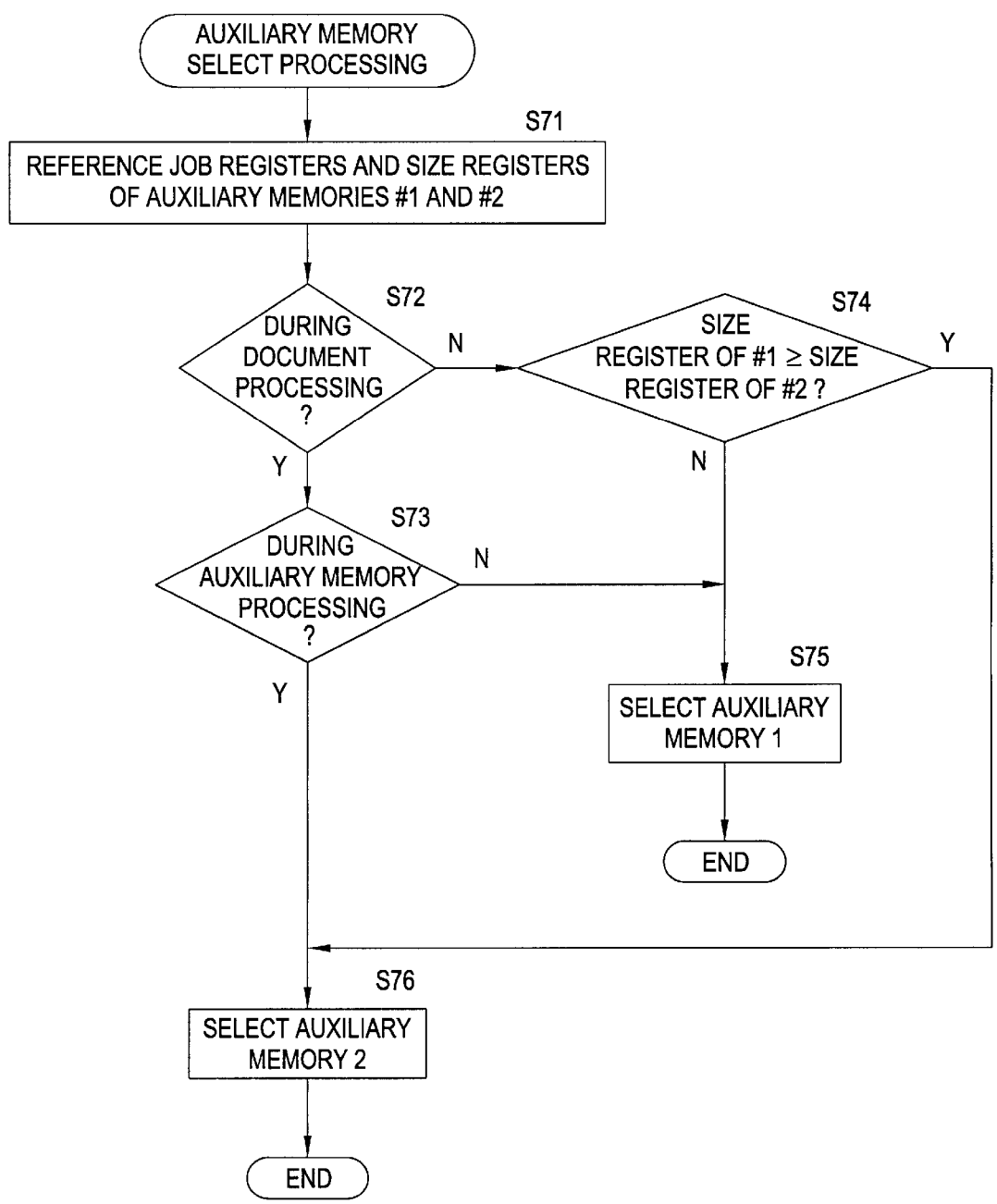
FIG. 8 is a flowchart describing an example of auxiliary memory selecting processing.

Referring to FIG. 8, there is shown a flowchart describing an example of auxiliary memory select processing. The auxiliary memory select processing in step 63 of FIG. 7 is performed as follows for example. In step 71, reference is made to the auxiliary memory #1 job register, the auxiliary memory #1 size register, the auxiliary memory #2 job register, and the auxiliary memory #2 size register, all in the control register 24. In step 72, the document processing status register is checked to determine whether the CPU 1 is performing document processing or not. If the CPU 1 is found performing document processing, whether the processing is on the document stored in the auxiliary memory 4 or 5 is determined in step 73. If the document being processed is in the auxiliary memory 4, the auxiliary memory 5 (the auxiliary memory #2) is selected in step 76. If the document being processed is in the auxiliary memory 5, the auxiliary memory 4 (the auxiliary memory #1) is selected in step 75. If the CPU 1 is not performing document processing, the value of the auxiliary memory #1 size register is compared with the value of the auxiliary memory #2 size register in step 74. If the value of the auxiliary memory #2 size register is found larger, the auxiliary memory 4 (the auxiliary memory #1) is selected in step 75; otherwise, the auxiliary memory 5 (the auxiliary memory #2) is selected in step 76. Thus, one of the two auxiliary memories is selected for storing document data. If a large amount of data comes filling up both the auxiliary memories, the communication section 7 instructs, via the communication medium, the source unit to discontinue the transfer.

In the foregoing description, the document processing is performed by the CPU 1. As shown in FIG. 1, when a plurality of CPUs are installed, the embodiment may be constituted such that the plurality of CPUs perform document processing cooperatively. In such a constitution, the storage location selector 6 may use part of the high-speed arithmetic processing provided by the CPUs to perform the selector's capability. Alternatively, the embodiment may be constituted so that memory transfer is made directly, without using the CPUs. In such a constitution, DMA (Direct Memory Access) may be used. It will be apparent that only one CPU is installed to make the same perform document processing, document data being transferred by means of DMA or the like.

Referring to FIG. 1, a bus is shared by the units constituting the embodiment. Alternatively, the portion of the main memory for storing document data may be constituted by a two-port memory to permit reading by the CPU 1 and writing by the storage location selector 6 simultaneously. This setup prevents the document processing from being degraded by bus congestion.

As described and according to the present invention, if the main memory has a free space, document data is transferred directly to the main memory. This novel setup allows the document processing that requires a large amount of data such as color document data to be implemented by a relatively low cost apparatus and performed efficiently.

While the preferred embodiment of the present invention has been described using specific terms, such description is for illustrative purposes only, and it is to be understood that changes and variations may be made without departing from the spirit or scope of the appended claims.

What is claimed is:

1. A document processing apparatus comprising:
    communication means for communicating with a unit connected via a communication medium;
    an auxiliary memory in communication with said communication means;
    a main memory in communication with said communication means;
    state holding means for indicating a state of said document processing apparatus;
    storage location selecting means for referencing the state held in said state holding means, selecting a storage location for storing a first document received through said communication means, and storing the received first document in said storage location; and
    processing means for performing processing on documents while they are stored in said main memory;
    wherein said state indicates whether a second document is currently stored in main memory and being processed by said processing means, wherein said storage location selecting means selects a part of said main memory as said storage location in one of situations in which said processing means is not performing processing on said second document and said processing means is performing processing on said second document but the first document to be processed satisfied a predetermined condition and wherein said storage location selecting means selects said auxiliary memory as said storage location when said processing means is performing processing on said second document and said first document does not satisfy a predetermined condition.

2. A document processing apparatus according to claim 1, wherein, when the part of the main memory is used as said storage location, said storage location is variable in storage size.

3. A document processing apparatus according to claim 1, wherein, when the first document has been stored in the part of said main memory, the first document processing by said processing means and storage of a third document received through said communication means into said auxiliary memory by said storage location selecting means are performed concurrently.

4. A document processing apparatus according to claim 1, wherein said auxiliary memory is provided in plural and said storage location selecting means selects one of the plurality of auxiliary memories.

5. A document processing apparatus for storing a document received via a communication line into a main memory directly or indirectly via an auxiliary memory, storing results in said main memory, said results being obtained by processing said document stored in said main memory by a particular document processing system, and outputting said results from said main memory, comprising:
    receiving means for receiving a plurality of documents to be processed;
    the main memory having a storage size at least larger than a maximum size of one page of the document described in system software of the processing system, said main memory storing the document received by said receiving means to be processed, an application of said processing system, and results obtained by processing said document by said processing system;
    an auxiliary memory for storing the document received by said receiving means; and
    a controlling section having a storage location selecting section for transferring the received document to one of said main memory and said auxiliary memory and monitoring means for monitoring a free space in said main memory obtained by excluding a storage size of the application of said processing system and a storage size of the processing results from a storage size of said main memory;
    wherein if the monitoring means indicates the free space in said main memory is larger than said maximum size of one page of the received document, the storage location selecting section transfers the received document directly into the main memory.

6. A document processing apparatus according to claim 5, wherein said controlling section further has means for numbering said plurality of documents received by said receiving means and said storage location selecting section sequentially stores in the main memory said plurality of documents in the order of the numbers assigned to the same.

* * * * *